May 13, 1930. R. A. OLSEN ET AL 1,758,370
HYDRAULICALLY CONTROLLED VARIABLE SPEED DEVICE
Filed Oct. 17, 1927
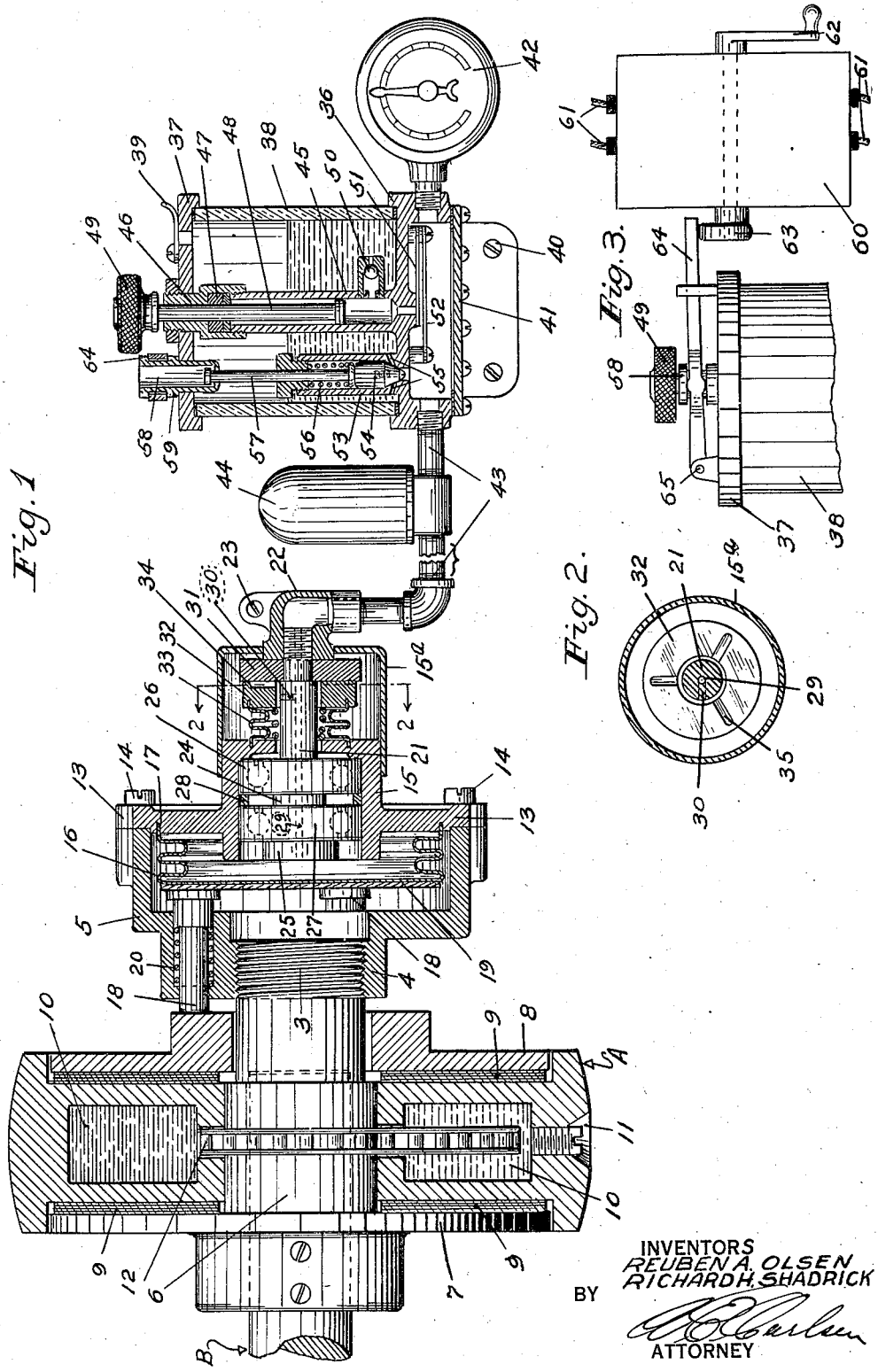
INVENTORS
REUBEN A. OLSEN
RICHARD H. SHADRICK
BY
ATTORNEY Patented May 13, 1930

1,758,370

UNITED STATES PATENT OFFICE

REUBEN A. OLSEN AND RICHARD H. SHADRICK, OF MINNEAPOLIS, MINNESOTA, ASSIGNORS OF ONE-THIRD TO ELLSWORTH T. SWANSON, OF MINNEAPOLIS, MINNESOTA

HYDRAULICALLY-CONTROLLED VARIABLE-SPEED DEVICE

Application filed October 17, 1927. Serial No. 226,744.

This invention relates to power transmitting mechanisms, and the primary object is to provide an efficient, practical, and novel device for controlling and varying the relative speed at which a driving member drives a driven member. A further object is to provide a device of that nature that is hydraulically operated, under the control of an operator who may be located at a local or remote point, in either event of which the only connection required between the manually operated unit and the device proper is a pipe for transmitting the operating fluid which transmits the hydrostatic or hydraulic pressure from one location to the other. A further object is to provide a hydraulic control of the character noted, in which the relative speeds between the driving and driven members will be directly proportionate to the pressure applied to the fluid medium, i. e., the greater such pressure the faster the driven member will operate and vice versa, with a result that a pressure gauge, communicating with the fluid, will not only disclose the operating pressure of the fluid, and give warning if the pressure should become excessive, but will also function as a speed indicator to indicate the speed of the driven member with respect to the driving member; and thus also will determine the exact speed of the driven member if the speed of the driving member is known when the reading is taken.

Another object is to provide means for automatically releasing the pressure in the system, when the motor or other power unit is shut off, thus eliminating the breakage, excessive strain, and other disadvantage that often result when an attempt is (usually unintentionally) made to start the motor under the load of the driven member and such machinery as it may be operatively connected to. In short we have provided means of a positive nature which will insure that the driving motor may also be started when the driving and driven members are operatively disconnected. Still further and more specific objects will be disclosed in the course of the following specification, reference being had to the accompanying drawing, wherein:

Fig. 1 is an elevation of the device complete, the major portion of which is shown in section, on a vertical plane taken diametrically through the device from end to end.

Fig. 2 is a detail section about as on the line 2—2 in Fig. 1.

Fig. 3 is a detail view of the switch box, for the power motor (not shown), and its operative connection with the pressure release thimble 58.

Referring to the drawing more particularly, and by reference characters, A designates a pulley which drives a shaft B. While A is referred to as the driving member and B the driven member, as a matter of convenience, it may here be noted that the functions of these members may be reversed, as far as the present invention is concerned, because it will function equally well if the pulley A is to be driven by the shaft B.

The shaft B has its end threaded, as at 3, to rigidly receive the threaded collar 4 of a casing 5. The shaft B has an integrally formed collar, or enlargement, 6 serving as a bearing for the pulley. At one end of the collar 6 is permanently and rigidly secured, to the shaft, a disk 7. A similar disk 8 is arranged upon the shaft, at the other side of the pulley, and while this disk is keyed to and therefore non-rotatable, with respect to the shaft, it has freedom for a limited endwise movement. This is also true with reference to the pulley, with a result that pressure applied to the disk 8 toward the pulley, will be complemented by or cause a similar pressure between the pulley and the disk 7. The opposed disk and pulley faces are provided with friction linings 9. The pulley A has an annular, inner lubricant pocket or chamber 10, adapted to be filled with oil, or drained, through a port 11. The pocket 10 opens to the shaft collar 6, and is provided with a chain element 12 for effecting a distribution of the lubricant to the shaft. The parts A, B and 6 to 12, inclusive, are substantially of common and well known construction, but have been detailed in order that the application and operation of the invention may be properly understood.

The casing 5 has an end plate 13, secured as by bolts 14, and this end plate has an integral, cup shaped, central hub 15. Within the casing 5 is a diaphragm 16, sealed against the end plate 13, as at 17. This diaphragm is of the accordion or resilient type that is longitudinally expansible under the action of internal, fluid pressure, and being anchored, as at 17, to the plate 13 it can only expand, when under pressure, in the opposite direction, or toward the pulley A. When the diaphragm so expands it presses against three (or more) pins 18, the opposite ends of which press against circumferentially spaced points of the disk 8. Thus, the internal pressure of the diaphragm is equalized and transmitted to the disks and pulley, with a result that the driving friction therebetween is entirely dependent upon the pressure within the diaphragm. The points of contact between the face of the diaphragm and the pins 18 is preferably reinforced by a face plate 19 which is of heavy plate metal so as to strengthen and prevent any bulging of the diaphragm face, between the points of contact with the pins. The pins are, of course, slidable in the casing 5, and are preferably provided with springs 20 that will tend to keep them retracted, and in contact with the diaphragm when the latter contracts under a reduction in pressure.

A non-rotating stub shaft 21, is secured at one end in an elbow 22, that is rigidly secured, as at 23, to a suitable stationary object, and extends into the cup 15, where it is provided with shoulders or enlargements 24 and 25. A pair of anti-friction bearing rings 26 and 27 are also arranged within the cup 15, and respectively abut against the shaft shoulders 24 and 25. These bearings are separated by a spacing ring 28, and are of the combination thrust and radial type, so that they will give proper bearing support between the cup 15 and the shaft 21. The shaft is provided with an axial duct 29, so as to permit fluid communication between the connection 22 and the diaphragm 16, and may also be provided with a by-pass 30 so as to allow the fluid, which is preferably oil, to be laterally conducted, under pressure, for other lubricating purposes.

A steel disk or plate 31 is rigidly secured against the elbow 22, and, like it, is non-rotatable. Rotatably engaging one face of this plate is a ring member or collar 32, that rotates with the cup 15 and is sealed with respect thereto by an expansible diaphragm 33. Within the diaphragm 33 is a spring 34 that abuts the cup 15 at one end while its other end abuts and tends to press the collar 32, with a sealing contact against the plate 31. It will be noted that the member 32 has a central aperture that is considerably larger than the shaft 21, so that the shaft cannot influence the self sealing condition that exists between the members 31 and 32, under the action of the spring 34, should there be a slight misalignment between any of these parts. It will also be noted that the parts 16, 13, 15, 33, 32, and 31 define substantially one, irregular inclosure for the oil, that the members (like 26, 27) all operate in the bath of oil within this inclosure, and that there is only exposed one joint, namely between 31 and 32, and that this joint is self sealing, not only because of the spring 34, but also because the inner face of the member 32 has a larger surface exposed to the oil, which is under pressure, than the surface contacting with the plate 31. The surface last mentioned is preferably provided with a few radial grooves 35 (see Fig. 2) to insure proper lubrication to this bearing surface.

It will thus be seen that it is never necessary to make a separate lubricating operation, as the device is always self lubricating by virtue of the very element that makes it operative, namely the pressure oil. Consequently the device requires practically no attention after it is once installed, a feature that is practically invaluable. A protecting cup 15ᵃ is preferably secured on 15 to house the members 31, 32 and 33.

We turn now to the pressure creating unit, a preferred form of which is illustrated, at the right, in Fig. 1. This unit comprises a hollow base 36, a cover plate 37, and a cylindrical body member 38, forming an oil reservoir or chamber. It is desirable to form the member 38 of glass so that the level of the oil (or other fluid) may be observed. Should the supply become low it is a simple matter to replenish it through the opening covered by the lid 39.

The base 36 is secured, as at 40, to a suitable rigid support, and has a cover plate 41, which may be removed for cleaning or repair purposes. One end of the base is connected with a pressure gauge 42, having suitable graduations, as previously noted, while its other end communicates with the elbow 22, through a pipe 43, that is of any size and length found necessary or convenient. An air chamber 44 is cut into the pipe 43, and has for its object to cushion the pressure in the fluid system, so that a sudden application of pressure will not tend to effect a jerky action to, or rupture any of the parts.

Referring again to the pressure creating unit proper, it will be seen that the base 36 and cover 37 are held together by a cylinder forming standard 45 and a thimble 46, between which two is a packing joint 47 for a plunger or piston 48, that operates in the cylinder 45 and extends up to a manually operable knob or handle 49. Oil is admitted to the cylinder 45, from the chamber 38, through a ball check valve 50. The oil is then expelled from the pump, under the downward movement of the piston, and into the hollow base 36, by passing a check valve, which, as shown, consists of a spring 51 which normally seats against the pump port. A rigid strip 52 is arranged, as a stop, below the spring 51, so that the latter will not become sprung or distorted under a sudden action of the pump.

We have also provided valve means, within the chamber 38, for manually and automatically releasing the pressure in the system, and returning the oil to the chamber. This consists of a cylinder 53 having a stopper 54 that normally closes ducts 55 leading from the chamber 38 to the hollow base 36, under the action of a spring 56. The stopper 54 has a rod 57, the upper headed end of which slidably engages in a thimble 58, which, in turn, is slidable in the plate 37, but has a shoulder 59 to limit its downward or inward movement.

When the operator desires to partly or entirely relieve the pressure in the system, he merely pulls up on the thimble 58. This in turn raises the stopper and opens the ducts 55. If the pressure should for any reason become excessive the stopper will be automatically raised, under such pressure, and the degree of pressure required for such automatic release will depend entirely upon the tension given the spring 56. The rod 57 is upwardly movable in the thimble 58 in order that the automatic pressure release will in no way be prevented even if the thimble should, for any reason, stick or be held down.

The operation of the device is no doubt obvious from the foregoing description. With the pressure entirely released the pulley A will travel idle on the shaft B. With the system filled with oil, each stroke of the pump piston 48 will now have a positive and direct effect upon the disk pins 18, with a resulting increase of friction between the pulley and disks, and speeding of the shaft B. The differences in the diameters of the pump 45 and diaphragm 16 will, of course, expand the diaphragm very slowly with respect to the speed of the pump, but on the other hand, the actual pressure, per square inch, is stepped up so high that the operator can, with ease, apply a tremendous pressure to the friction members by a few easy strokes of the pump piston 48—49.

Referring now to Fig. 3, wherein is illustrated the safety pressure release, previously referred to, 60 designates a switch box, which is cut into the circuit wires 61 of the motor, which furnishes power to run the driving member A (or B, as the case may be), and 62 designates the switch lever, which, when raised, closes the motor circuit, and which, when lowered, as shown, opens the circuit to stop the motor. The lever 62 is provided with a cam or eccentric 63, which operates to lift lever 64, pivoted as at 65, and which, in turn, acts to raise the pressure release stopper 54. It will thus be seen that when the motor circuit is switched off then the pressure in the hydraulic system is released, and cannot be reinstated until after the motor has first been started and the ducts 55 are closed. Thus the motor can never be started under the load of the driven mechanism.

It is understood that suitable modifications may be made in the general design and structural details of the invention as herein shown and described, provided, however, that said modifications come within the spirit and scope of the appended claims. Having now therefore fully shown and described our invention, what we claim to be new and desire to protect by Letters Patent is:

1. The combination including a driving member, a driven member, and hydraulically operative pressure means for varying the relative speeds of said members, said means comprising relatively stationary members and rotatable members having bearing engagement with and forming a housing for said stationary members, said housing being in communication with the pressure means whereby the bearing engagement will operate in and be lubricated by the fluid element of the hydraulic pressure means.

2. The combination including a driving member, a driven member, and hydraulically operative pressure means for varying the relative speeds of said members, said means comprising relatively stationary members and rotatable members having bearing engagement with and forming a housing for said stationary members, and said housing being sealed, under the action of the hydraulic pressure, so as to confine the fluid agent therein.

3. The combination of a shaft, a power member rotatable thereon, a disk for frictionally connecting the member and shaft, a housing carried by the shaft, a diaphragm within the housing and adapted upon being distended to actuate the disk, said housing having a hub opening into the diaphragm, a non-rotatable member extending into the hub for supplying liquid under pressure to the diaphragm, and roller bearings between the hub and said non-rotatable member.

4. The combination with a shaft having a pulley thereon and adapted to be frictionally connected therewith whereby one will drive the other, of an inclosure including a diaphragm adapted upon being distended to increase the friction between the shaft and pulley, a conduit adapted to admit fluid under pressure to the inclosure, and means, including a second diaphragm, subjected to the fluid pressure within said inclosure, for sealing the inclosure with respect to the conduit.

5. The combination with a shaft having a pulley thereon and adapted to be frictionally connected therewith whereby one will drive the other, of a housing carried by and rotatable with the shaft, a diaphragm within the housing and adapted upon being distended to increase the friction between the pulley and shaft, a conduit extending into the housing for supplying fluid under pressure to the diaphragm, and means rotatable with the housing, and under the influence of such fluid pressure, for sealing the housing with respect to the conduit.

In testimony whereof we affix our signatures.

REUBEN A. OLSEN.
RICHARD H. SHADRICK.